Nov. 8, 1949 C. E. LITTLE Re. 23,165

APPARATUS FOR HANDLING CONCRETE AND THE LIKE

Original Filed Aug. 28, 1933 3 Sheets-Sheet 1

Inventor
Charles E. Little
By
His Attorney

APPARATUS FOR HANDLING CONCRETE AND THE LIKE

Original Filed Aug. 28, 1933 3 Sheets-Sheet 2

Inventor
Charles E. Little
By
His Attorney

Nov. 8, 1949 C. E. LITTLE Re. 23,165
APPARATUS FOR HANDLING CONCRETE AND THE LIKE
Original Filed Aug. 28, 1933 3 Sheets-Sheet 3
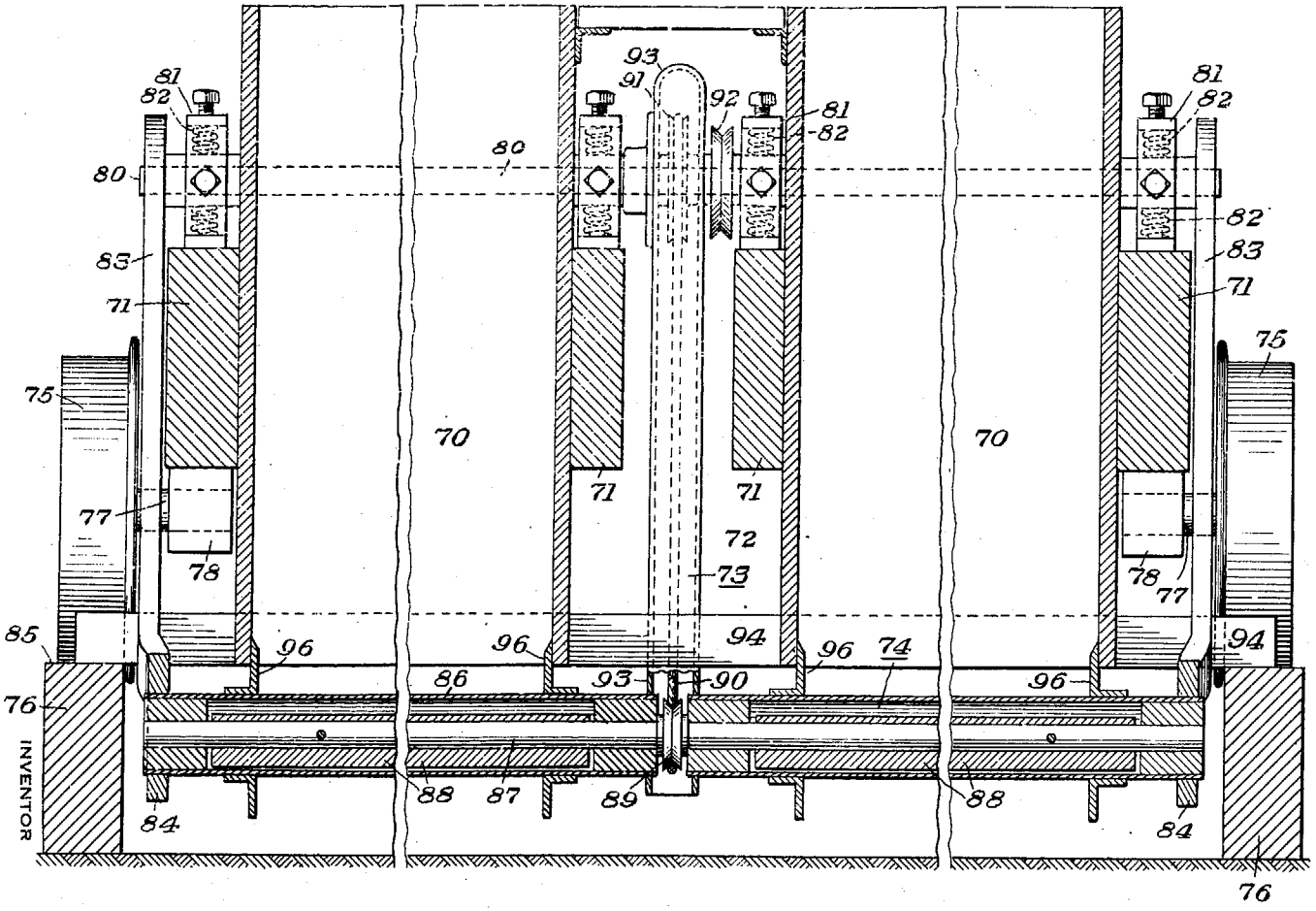

Reissued Nov. 8, 1949 Re. 23,165

UNITED STATES PATENT OFFICE 23,165

APPARATUS FOR HANDLING CONCRETE AND THE LIKE

Charles E. Little, Los Angeles, Calif., assignor to Clyde W. Wood, Los Angeles, Calif.

Original No. 2,101,031, dated December 7, 1937, Serial No. 687,105, August 28, 1933. Application for reissue July 28, 1949, Serial No. 107,285

4 Claims. (Cl. 94—46)

Figure 1:
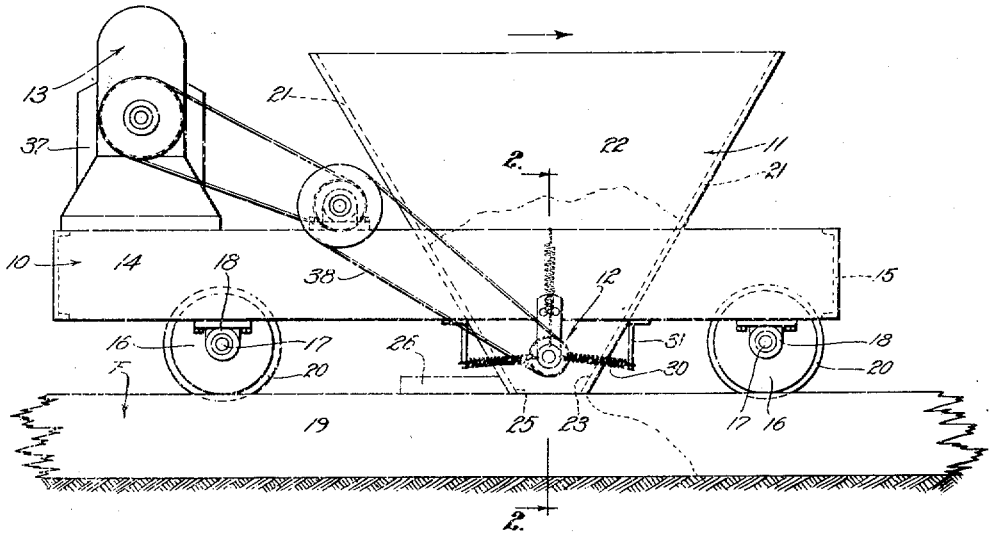

This invention relates to a method and apparatus for handling concrete and other granular materials and it is a general object of the invention to provide a simple, commercially practical and particularly efficient method for handling concrete, and the like, and to provide improved effective apparatus for carrying out said methods.

Various methods have been introduced for mechanically tamping and compacting concrete and similar materials. These methods have usually involved the vibration of the material already poured in the mold or form and do not contemplate the vibration of the material being acted on or engaged by the strike off edge of an advancing hopper or forming templet. Further, many of the compacting devices that have been introduced operate to impart a partially effective jarring or vibratory action to spaced limited zones or portions of the poured material and therefore do not cause a uniform intimate cohesion or compacting of the entire body of material.

It is an object of the invention to provide an improved method of handling concrete, and other granular materials, that contemplates the introduction of material to a mold or form and the continuous vibration of the mass of material flowing or moving to the form and the adjacent portion of the mass within the mold or form being acted upon by the strike off edge of the advancing templet or hopper to bring about the effective compacting of the material and to provide a regular or substantially smooth surface on the material in the form.

It is another object of the invention to provide a method of compacting concrete, and the like, that does not necessitate the introduction or insertion of mechanical parts into the concrete within the mold or form, or the vibration of the mold or form.

It is another object of the invention to provide a method for handling concrete that permits the use of a concrete of low water content and of a low sand content in the production of a product of high character and quality.

It is another object of the invention to provide a method for handling concrete, and the like, that includes the pouring or moving of the concrete into a form and the compacting or the flowing of inwardly moving concrete by a particularly effective vibratory action that results in the concrete being substantially rigid, immobile, or nonflowing, immediately upon its introduction to the mold or form.

It is another object of the invention to provide apparatus for handling concrete, and other granular materials, that includes means operable to impart a peculiar and particularly effective vibratory motion to the concrete, or other material being handled, to bring about the compacting and intimate cohesion of its component constituents.

It is another object of the invention to provide apparatus for handling concrete, and other granular materials, that includes means for introducing the material to a mold or form and means for continuously imparting an effective compacting action to the material entering and about to enter the form, as well as to a substantial portion of the adjacent material in the form. In practice the apparatus provided by the present invention operates to continuously vibrate the material about to enter the form and the adjacent material recently introduced into the form as a single mass or body to effect its complete consolidation or compacting as the introduction of the material into the form progresses.

It is another object of the invention to provide a simple, inexpensive material handling apparatus that may be advanced along a form as it introduces the material into the form and that includes a particularly efficient compacting means continuously acting on the inwardly moving body of material and the adjacent co-extensive portion of the material that has reached the form to spread the material throughout the width or extent of the form, to cause the intimate cohesion or compacting of the entire body of material, and to give the poured body of material a smooth, uniform and regular surface.

It is a further object of the invention to provide a concrete-handling apparatus of the character mentioned that may be embodied in a simple, inexpensive form or structure.

Figure 2:
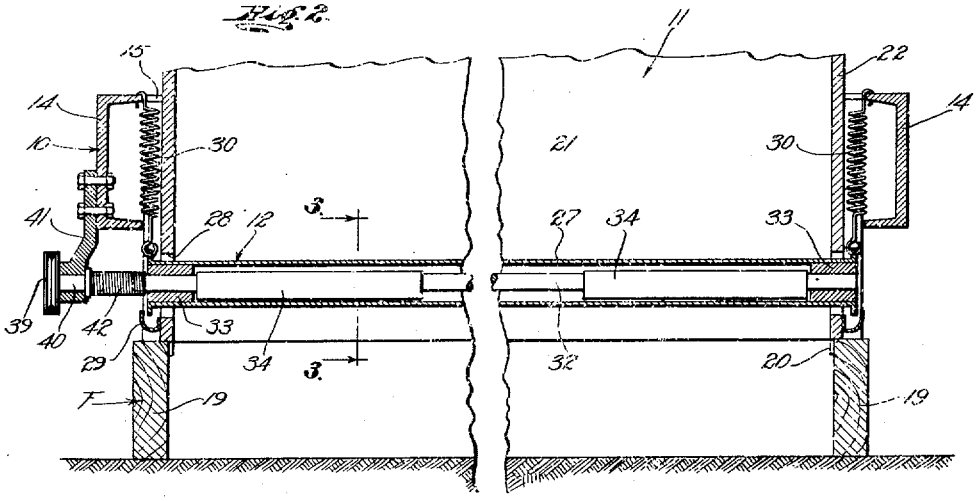
Figure 3:
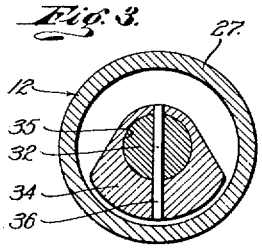
Figure 4:
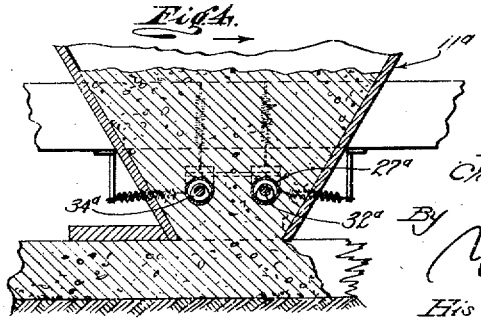
Figure 5:
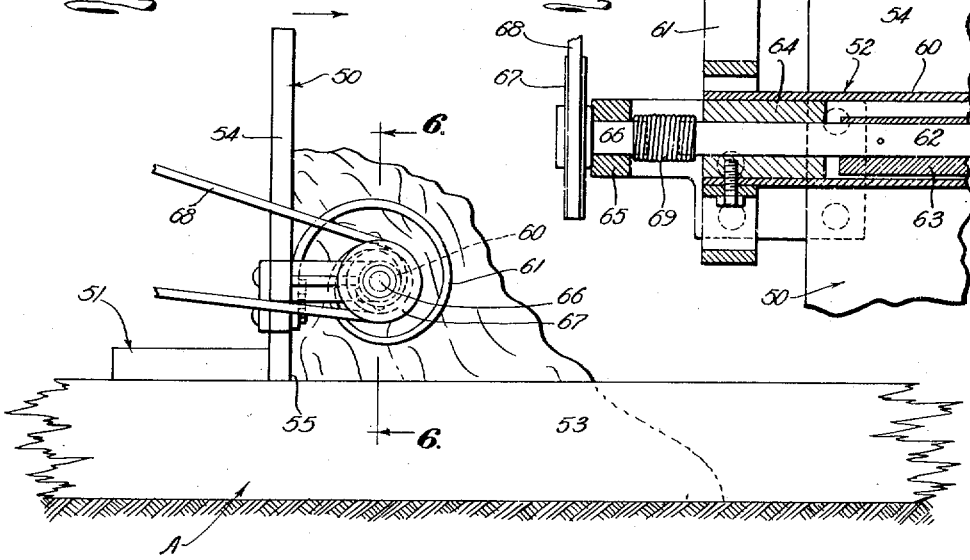
Figure 6:
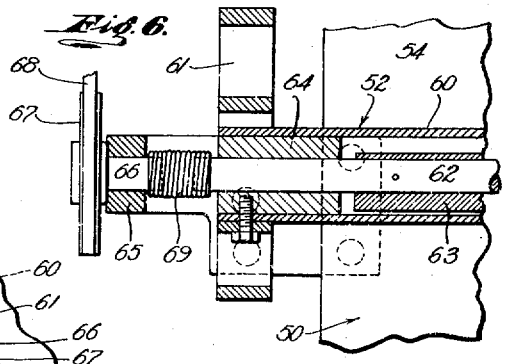
Figure 7:
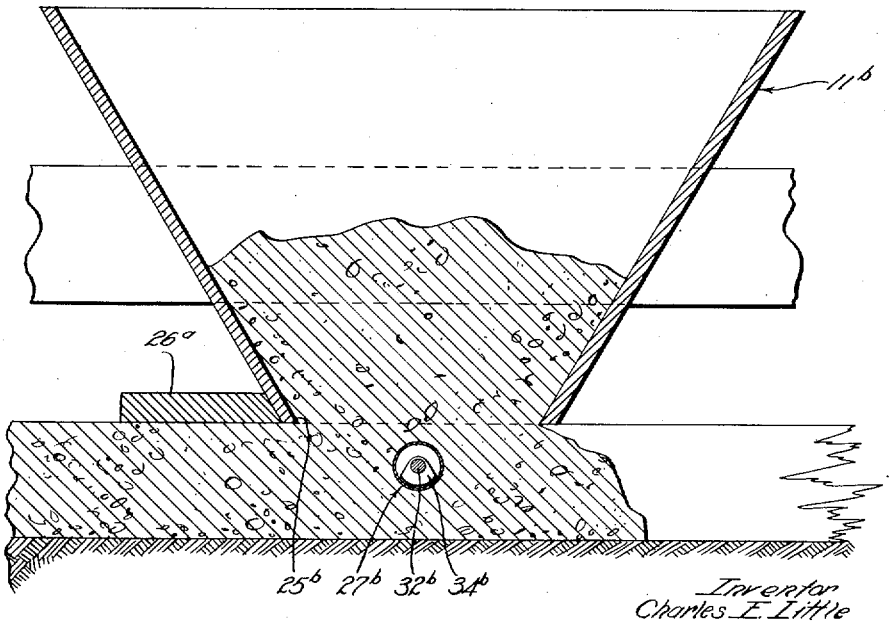

Other objects and features of the invention will be best and fully understood from the following detailed description of typical manners of carrying out the invention and typical forms and applications of the invention, throughout which description reference is had to the accompanying drawings, in which:

Fig. 1 is a side elevation of one typical embodiment of the invention for carrying out the method of the invention. Fig. 2 is an enlarged vertical detailed sectional view taken as indicated by line 2—2 on Fig. 1. Fig. 3 is an enlarged transverse detailed sectional view taken as indicated by line 3—3 on Fig. 2. Fig. 4 is a fragmentary vertical detailed sectional view of a form of apparatus including two vibrating elements. Fig. 5 is a side elevation of another form of apparatus of the invention for carrying out the method. Fig. 6 is an enlarged vertical detailed sectional view taken as indicated by line 6—6 on Fig. 5. Fig. 7 is a fragmentary detailed sectional view of apparatus in which the vibrating element is below the hopper. Figure 8 is a vertical sectional view of Figure 7.

The method and apparatus of the present invention is adapted to be employed in the handling of material of various characters and in the formation or production of various structures. The invention is particularly adapted to be carried out in the handling of concrete and like granular materials and I will describe the invention in connection with the handling of such material, it being understood that reference to this application or use of the invention is not to be construed as a limitation or restriction of its scope.

The method of the present invention broadly considered contemplates or includes the moving or introducing of concrete or other material into a matrix, mold, or form, and the continuous peculiar vibration of the moving mass and the adjacent coextensive portion of the mass in the form or mold being surfaced or engaged by the strike off edge of the advancing hopper or forming templet. To facilitate a clearer understanding of the method, I will first describe several typical forms of apparatus provided by the invention adapted to be employed in carrying out the method and I will follow the description of the apparatus with a more detailed description or disclosure of the method provided by the invention.

The apparatus of the present invention illustrated in Figs. 1 to 3 inclusive of the drawings is useful in the pouring and compacting of concrete in the making of roads, and the like, and includes, generally, a chassis or mobile body 10, a hopper 11 on the body for passing or introducing material into a form F, means 12 for acting upon or vibrating the material moving into the form F and the adjacent material in the form to compact it or bring about the intimate cohesion of its component constituents, and power means 13 for operating the means 12.

The chassis of mobile body 10 may vary considerably in construction and proportions, etc., and the present invention is not primarily concerned with the specific details of its construction. In the simple form of apparatus illustrated in the drawings the body 10 includes spaced longitudinal frame members 14 and transverse frame members 15 connecting the members 14. The body 10 may be suitably braced or reinforced as found necessary. Longitudinal spaced wheels 16 are provided on the longitudinal frame members 14. The axles 17 of the wheels 16 may be carried by bearings 18 attached to the frame members 14. The wheels 16 are provided to operate on the side forms or header boards 19 of the form F. The wheels 16 are preferably provided with peripheral flanges 20 to prevent displacement of the body 10 from the form F.

The hopper 11 is mounted on or carried by the mobile body 10 and is operable to pass or introduce the material or concrete into the form F. The hopper 11 is preferably proportioned and positioned to introduce the material throughout the width of the form F, that is, from one side of the form to the other. In the particular embodiment of the invention illustrated in the drawings the hopper 11 is an open-topped structure having downwardly and inwardly convergent sides 21 and substantially vertical closed ends 22. The ends 22 of the hopper pass downwardly at the inner sides of the body frame members 14 to project downwardly from the lower side of the body. The lower end of the hopper 11 may slidably engage the upper sides of the form. In accordance with the invention, the restricted or reduced lower end of the hopper 11 is open to discharge into the form F. The opening 23 in the lower end of the hopper 11 is preferably of sufficient capacity to discharge or pass a substantial volume of material. The lower edge of the rear side 21 of the hopper 11 relative to the direction of advancement of the apparatus constitutes a strike off edge 25 for striking off the concrete. It will be understood how the lower portion of the rear side 21 of the hopper 11 operates as a forming templet for striking off or shaping the surface of the concrete.

The invention provides a finishing templet 26 to trail or follow the strike off edge 25 of the hopper 11 in its movement along the form F to provide for the desired regular surface on the road or strip and to prevent the vibration of the adjacent zone or portion of concrete from causing the concrete to surge or bulge above the upper edge of the form F. In the particular apparatus illustrated the finishing templet 26 is in the nature of a horizontally disposed plate arranged immediately adjacent the lower end of the rear side 21 of the hopper. The lower surface of the finishing templet 26 is operable to engage the upper surface of the poured strip of concrete to prevent the concrete from rising above the upper surface of the form.

The means 12 is provided to continuously vibrate the material or concrete to be acted upon or within the zone of action of the strike-off edge 25, and in accordance with the form of the invention being described, is operable to continuously vibrate the material or concrete within the lower portion of the hopper 11 as well as the zone or portion of concrete in the form F immediately below the hopper which is being acted upon or that is about to be acted upon by the strike-off edge 25. The means 12 operates to impart a peculiar vibratory motion to the material or concrete in the lower portion of the hopper 11 and the concrete in the form F immediately below the hopper to bring about its universal compacting, or the universal intimate cohesion of its component constituents. In the typical application or form of the invention being described the means 12 includes a vibratory element 27 extending through the hopper 11 to intimately or directly act on the inwardly moving concrete at or within the zone of operation of the strike off edge 25 of the hopper 11. While I have illustrated the apparatus as including only a single vibratory element 27, it is to be understood that the apparatus may include two or more of such elements as illustrated in Fig. 4 of the drawings.

The vibrating element 27 is preferably in the form of an elongate tube that is imperforate and closed and sealed against the entrance of the concrete or material being handled, it being understood that the element 27 may be of any practical shape and construction. The vibrating element 27 preferably extends transversely through the hopper 11 from one end 22 to the other. In the particular arrangement illustrated in the drawings, the vibrating element 27 is centrally spaced between the opposite sides 21 of the hopper 11 and is spaced some distance above the lower end of the hopper, it being understood that the position or disposition of the vibrating element 27 may be changed or varied as found most practical and desirable to provide for the effective vibration of the material in the vicinity of the strike off edge of the hopper. The opposite end portions of the vibrating tube or element 27 extend through openings 28 in the opposite ends 22 of the hopper. The openings 28 are sufficiently large to allow for the desired or necessary vibratory motion of the element 27. If desired or found practical, means may be provided to prevent the leakage of material or concrete through the openings 28; however, in the particular case illustrated in the drawings, the openings 28 are not sealed and troughs 29 are provided to catch or receive any material that may leak through the openings.

The element 27 is flexibly or resiliently supported so as to be free to vibrate. In accordance with the broader aspects of the invention, the element 27 may be resiliently mounted or supported for universal lateral movement or vibration in any practical manner. In the apparatus being described, the opposite end portions of the element 27 are supported by springs 30. There may be three spaced springs connected with each end of the element 27. The springs 30 may be connected with the side members 14 of the frame or body by suitable brackets 31 which support the element from the body. The springs 30 carry the element 27 for free vibration in a manner so that no undesirable vibratory movement is transmitted from the element 27 to the frame or body 10.

The invention provides effective means for actuating or vibrating the element 27. A rotatable shaft 32 extends longitudinally through the element 27 and is rotatably supported by suitable bearings 33 in the end portions of the element 27. The shaft 32 is preferably concentrically disposed within the element 27 and has an end projecting from an end of the element. A plurality of longitudinally spaced weights 34 are moulded on the shaft 32. The weights 34 are dynamically eccentric, that is, they have their greatest mass or center of gravity spaced from the axis of rotation of the shaft 32. The several weights 34 preferably all have their centers of gravity in the same rotative positions relative to the axis of rotation of the shaft. The weights 34 may be of any suitable construction and may be mounted or attached to the shaft 27 in any desirable manner. In the particular construction illustrated in the drawings, the weights 34 have openings 35 passing the shaft 32 and are attached to the shaft by pins 36. It will be apparent that when the shaft 32 is rotated at a high speed, the weights 34 cause the continuous vibration of the shaft 32 and the tube 27 carrying the shaft. This vibration of the tube 27 is of course transmitted to the adjacent surrounding concrete. In practice, it is desirable to rotate the shaft 32 at about five thousand or six thousand revolutions per minute to cause the rapid vibration of the element 27. The continuous rapid vibration of the element 27 extending throughout the entire width of the hopper 11 causes the vibration of the material in the hopper and the vibration of the portion of the material in the form F below the hopper that is discharging from or that has just been discharged from the hopper.

The power means 13 is provided to rotate the shaft 32 to bring about the vibration of the vibratory element 27. The type of power means employed may be varied considerably, depending upon the various conditions and factors of the operation of the apparatus. For the purpose of illustration, I have illustrated an engine or motor 37 mounted on the chassis 10. The power unit 37 is spaced behind the hopper 11 relative to the direction of advancement of the apparatus along the form F. A pulley and belt drive 38 is provided between the power unit or engine 37 and a pulley 39 mounted on a shaft 40 positioned in axial alignment with the shaft 32 at one side of the chassis 10. The shaft 40 may be carried by a suitable bracket 41 attached to a frame member 14. A flexible driving or operative connection is provided between the pulley and shaft 32. The particular flexible driving connection illustrated in the drawings comprises a cylindrical or helical spring 42 extending between and connected to the opposing ends of the shafts 32 and 40. It will be apparent how the spring 42 effectively connects the shaft 32 with the shaft 40 for rotation and yet allows the free vibration of the shaft 32.

It is believed that the operation of the form of the invention illustrated in Figs. 1, 2 and 3 of the drawings will be readily apparent from the foregoing detailed description. During operation the apparatus is advanced along the form F in the direction indicated by the arrow in Fig. 1, by any usual or suitable means and material is delivered or supplied to the hopper 11 to maintain a sufficient mass of material in the hopper to cover the vibratory element 27. The shaft 32 is continuously rotated in the manner described above to provide for the continuous rapid vibration of the element 27. The material or concrete of course, flows or discharges from the open lower end of the hopper 11 into the form F, and a sufficient supply of material is maintained in the hopper to provide for the spreading of the material throughout the entire width of the form. The continuously vibrated element 27 passes through the material or concrete in the immediate vicinity of the strike off edge 25 of the hopper 11 so that the advancing edge 25 effectively levels or strikes off the strip of concrete flush with the surface of the form F. As the material or concrete being acted upon or engaged by the strike off edge 25 is continuously vibrated, rocks or coarse material in the concrete are not dragged along in front of the strike off edge 25. Due to this feature of operation of the apparatus, concrete having a high percentage of coarse material and concrete having a low water content and a low sand content may be used without danger of impairing the surface of the finished concrete. When the vibrating element 27 extends through the hopper 11 as illustrated in Figs. 1, 2 and 3 of the drawings, the material or concrete in the hopper as well as the adjacent zone or portion of concrete in the form is continuously vibrated. This continuous vibration of the concrete moving or flowing into the form F as well as the concrete that has just reached the form, insures the universal complete compacting of the concrete as the pouring operation continues. Further, the vibrating element 27, in extending from one end of the hopper 11 to the other, materially aids in distributing or spreading the inflowing concrete across the entire width of the form F. It is to be noted that the apparatus is particularly efficient in operation and does not necessitate the insertion of mechanical parts into the form during the pouring of the concrete.

The form of the apparatus illustrated in Fig. 4 of the drawings includes two spaced vibrating elements 27a extending through the lower portion of a hopper 11a. The hopper 11a and the various other parts of the apparatus may be similar to or identical with the corresponding parts of the apparatus illustrated in Figs. 1, 2 and 3 of the drawings. The vibrating elements 27a may be in the nature of tubes which extend transversely or horizontally through the lower end portion of the hopper 11a. The vibrating elements 27a are spaced one in advance of the other and may be supported for free relative vibration in the same manner as the element 27 described above. Rotating shafts 32a extend longitudinally through the vibrating elements 27a and carry eccentric weights 34a for causing the vibration of the shafts and elements 27a. The shafts 32a may be rotated in any practical or desirable manner to provide for the continuous vibration of the elements 27a. The apparatus illustrated in Fig. 4 of the drawings operates in substantially the same manner as the previously described apparatus, the disclosure in Fig. 4 of the drawings being provided to illustrate a typical application of the invention involving more than one vibrating element.

The apparatus illustrated in Figs. 5 and 6 of the drawings includes generally, a spreading and forming templet 50, a finishing templet 51, and means 52 for vibrating the material or concrete in the vicinity of the strike off edge of the templet 50.

The forming templet 50 is adapted to be advanced along a form, for example, along the header boards 53 of a road form A to spread the concrete C across the form and to strike off the material. The forming templet 50 may be of usual or simple construction, that is, it may consist of a vertically disposed board or plate 54 adapted to extend across the form A from one header board 53 to the other. The forward or advancing face of the templet 50 is preferably normal to the plane of the upper surface of the form. The material or concrete is introduced into the form A in front of the templet 50 in sufficient volume to pile up to a substantial extent in front of the templet somewhat in the manner illustrated in Fig. 5 of the drawings, and to spread throughout the entire width of the form. The forward lower edge of the forming templet 50 constitutes a strike off edge 55 for striking off the concrete.

The finishing templet 51 projects rearwardly from the lower end of the templet 50 to trail or follow up the strike off edge in its action on the concrete in the form. In the particular apparatus illustrated the finishing templet 51 is a horizontal member suitably attached to the forming templet 54 and has a flat horizontal lower face to slidably engage the form and the surface of the concrete in the form. In accordance with the preferred construction, the finishing templet 51 extends completely across the form A from one side to the other and is of sufficient width to prevent the concrete from rising or bulging above the intended or desired surface due to the vibratory action to which it is subjected by the means 52.

The means 52 is provided to vibrate the concrete in the immediate vicinity of the strike off edge of the forming templet to insure the easy efficient operation of the forming templet and to effectively compact the concrete moving into the form. The means 52 includes a vibrating member or element 60 spaced in front of the forming templet 50 and spaced above the form A. The element 60 may be in the form of an imperforate tube extending completely across the form A from one end of the templet to the other. In accordance with the invention, the vibrating element 60 is mounted or supported for free vibratory motion. Resilient or flexible members 61 are provided to support the opposite ends of the element 60. In the form of the apparatus illustrated in Figs. 5 and 6 of the drawings, the resilient members 61 are in the nature of helical or spiral springs, each having one end connected to the element 52 and one end attached to the forming templet 50. It will be apparent how the springs 61 support the element 52 for free vibration in all directions lateral of its longitudinal axis.

The invention includes means for continuously vibrating the element 60 at a rapid rate to bring about the intimate cohesion of the constituents of the material or concrete. A rotatable shaft 62 extends longitudinally through the vibrating element 52 and carries a plurality of longitudinally spaced dynamically eccentric weights 63. The several weights 63 are preferably all in the same rotative position. When the shaft 62 is rotated at a high speed, the inertia or momentum of the eccentric weights 63 causes the rapid vibration of the shaft 62. The shaft 62 is rotatably supported in the element 52 by suitable bearings 64 located in the end portions of the element.

A suitable driving connection may be provided to drive or rotate the shaft 62 by any suitable type of power means. A bracket 65 projects from an end of the forming templet 50 and carries the rotating shaft 66 of a pulley 67. A belt 68 may operatively connect the pulley 67 with the driving pulley of the power unit. A coiled or helical spring 69 extends between and connects the opposing ends of the shafts 62 and 66. It will be apparent how the spring 69 is adapted to transmit rotation from the shaft 66 to the shaft 62 and yet permit the free vibration of the shaft 62 with respect to the pulley shaft.

In the operation of the apparatus illustrated in Figs. 5 and 6 of the drawings, the material or concrete is supplied or delivered to the form in front of the forming templet 50. The templet 50 and the associated parts are suitably advanced along the form A, in the direction indicated by the arrow, to spread the concrete across the form and to level the concrete to the upper surface of the form. The tube or element 60 is continuously and rapidly vibrated in the manner described above and its vibration is transmitted to the concrete in the immediate vicinity of the strike off edge 55. There is preferably a sufficient mass of concrete in front of the templet 50 and above the form A to cover the vibrating element 60. The springs 61 supporting the vibrating element 60 allow for the free rapid vibration of the element 60 without transmitting excessive vibratory motion to the templet 50. The material or concrete in front of the templet 50 that has not yet reached the form A and the concrete in the form below the templet 50 is continuously agitated or vibrated by the element 60 as the pouring operation progresses or continues so as to bring about the complete compacting of the concrete, or the intimate cohesion of the constituents of the concrete throughout the entire form. The vibration of the material or concrete in the immediate vicinity of the advancing strike off edge 55 allows the apparatus to be advanced with a minimum effort or by a minimum amount of power, and provides for the production of a smooth regular surface when concrete of a very low water content and low sand content is used.

Figures 7 and 8 illustrate an embodiment of the invention in which the vibrator is located below the bottom of the hopper and at a level somewhat below the tops of the forms on which the distributing device runs.

In this embodiment there are two hoppers 70 supported by longitudinally extending horizontal frame members 71. The hoppers are spaced apart to provide a space 72 in which the drive indicated generally by the reference numeral 73 for the vibrator 74 is located. The frame members 71 which support the hoppers are carried by wheels 75 which run on the rails or forms 76. The axles 77 of the wheels are supported in bearing blocks 78 secured to the outer frame members 71.

A countershaft 80 located adjacent the tops of the hoppers and to the rear thereof so as to be outside of the hoppers, is mounted in bearings 81 supported by the frame members 71. The bearings 81 are provided with springs 82 so that the vibration of the countershaft 80 as hereinafter described does not cause vibration of the hoppers 70.

Pivoted at each end of the countershaft 80 is a hanger rod 83 having its lower end 84 extending to a point below the tops 85 of the forms 76. The two hanger rods 83 support the vibrator 74 which is of a construction generally similar to that described in connection with the other embodiments. The vibrator 74 comprises an outer tubular element 86 within which is mounted a shaft 87 having two eccentrically mounted weights 88. The shaft 87 is provided intermediate its ends with a pulley 89 which is operated by a belt 90 which passes around a pulley 91 secured to the countershaft 80. The countershaft is provided with a driving pulley 92 which may be driven from any suitable source in a manner similar to that indicated in Figure 1. The pulley 89 on the vibrator, the pulley 91 on the countershaft, and the belt 90 are enclosed within a housing 93 so as to protect the pulley 89 and the belt from the concrete or other material which is being handled. A finishing templet 94 extends across the machine at the rear of the hoppers 70. The ends of the hoppers 70 are notched as indicated by the reference numeral 95 for receiving the vibrator 74 when in its raised position indicated by chain lines in Figure 7. The notches 95 are covered by plates 96 secured to and movable with the vibrator. The mounting of the vibrator on the hanger arms 83 enables it to be raised to pass any obstructions which may be encountered.

In the operation of the device illustrated in Figures 7 and 8, the countershaft 80 is rotated and thus the shaft 87 of the vibrator is also rotated due to the belt and pulley connections between the countershaft and shaft 87. Vibration of the vibrator 74 is prevented from being transmitted to the hoppers 70 because of the spring mountings 82 which carry the countershaft 80. Thus, the vibrator is free to vibrate relative to the hoppers.

The method of handling concrete, and other granular materials, provided by the present invention and as carried out by the apparatus of the invention includes, generally, the moving or introduction of concrete or material into the form at or in the presence of an advancing strike off edge, and the continued vibration of the zone or portion of concrete or material at the strike off edge.

In carrying out the method of the invention, the concrete is preferably introduced into the form in a manner so that there is a considerable volume of concrete in the hopper or in front of the templet, that has not reached or entered the form. A suitable volume of concrete is preferably maintained in the hopper or in front of the templet as the pouring and/or forming apparatus advances along the form. As carried out in the apparatus illustrated in Figs. 1, 2, 3, 4, 5 and 6 of the drawings, the material in the hopper or in front of the advancing forming templet is directly acted upon or vibrated by a vibrating element while in the embodiment of the invention illustrated in Fig. 7 of the drawings, the material or concrete in the form below the hopper is directly acted upon by a vibrating element, it being understood that the zone or area of active influence of the vibrating element in each instance is coextensive throughout the material in the hopper or in front of the templet and the material in the form below the hopper or templet and at the strike off edge of the advancing hopper or templet. This vibration of the concrete or material being introduced into the form, in addition to effectively compacting the concrete, insures the provision of a smooth regular surface by the action of the strike-off edge. Due to this feature or phase of the method, the method may be effectively carried out where coarse concrete of low water content and low sand content is used. The vibration of the concrete at the strike off edge or being engaged by the strike off edge overcomes any tendency of dry concrete or large coarse material in the concrete to move or drag along with the strike off plate of the hopper or templet. In carrying out the invention, the vibration of the concrete is preferably universal throughout the entire length of the hopper or forming templet to bring about the uniform compacting of the concrete and to materially aid in properly distributing or spreading the concrete throughout the width of the form. It is to be noted that the method of handling concrete and other granular materials provided by the present invention greatly facilitates the pouring of concrete and the like and insures its proper uniform compacting.

Having described only typical forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. An apparatus for spreading and compacting paving materials, such apparatus comprising a mobile unit including a supporting frame and a hopper mounted in said frame, said unit being movable longitudinally along the paving strip under construction, the hopper having an open lower end for the discharge of material to form the strip, a finishing templet attached to the lower edge of the back wall of the hopper and trailing rearwardly therefrom, a vibratory element separate from the hopper and disposed forwardly of the rear wall of the hopper in substantial parallelism therewith and in a horizontal plane adjacent the open end of the hopper, flexible hangers mounted on the unit with one end free, the vibratory element being supported on the free ends of the hangers clear of the hopper walls, whereby the hangers are effective to contain the thrust of the vibratory element against transmission of any substantial portion of such thrust to the hopper walls, and means to impart vibratory motion to such element.

2. An apparatus for spreading and compacting paving materials, such apparatus comprising a mobile unit including a supporting frame and a hopper mounted in said frame, said unit being movable longitudinally along the paving strip under construction, the hopper having an open lower end for the discharge of material to form the strip, a finishing templet attached to the lower edge of the back wall of the hopper and trailing rearwardly therefrom, a vibratory element separate from the hopper and disposed forwardly of the rear wall of the hopper in substantial parallelism therewith and in a horizontal plane adjacent the open end of the hopper, flexible supports on the unit, the vibratory element being suspended on said supports clear of the hopper walls, the supports being effective to contain the thrust of the vibratory element against transmission of any substantial portion of such thrust to the hopper walls, and means to impart vibratory motion to such element.

3. An apparatus as in claim 2 in which the vibratory element is a hollow tube, and the means for imparting vibration thereto comprises a shaft projecting longitudinally through the tube and journaled for rotation therein, a driven shaft journaled on the unit co-axially with the first shaft, a flexible connection between the adjacent ends of the shafts, and power means connected in driving relation with the driven shaft.

4. An apparatus as in claim 3 in which the flexible connection between the shafts is a coiled spring connected at each end to one of the shafts co-axially therewith.

CHARLES E. LITTLE.

REFERENCES CITED

The following references are of record in the file of this patent:

UNITED STATES PATENTS

| Number | Name | Date |
|---|---|---|
| 1,293,662 | Atterbury | Feb. 11, 1919 |
| 1,652,434 | George et al. | Dec. 13, 1927 |
| 1,974,013 | Clausen | Sept. 18, 1934 |
| 1,989,409 | Gordon | Jan. 29, 1935 |
| 2,090,959 | Jackson | Aug. 24, 1937 |